United States Patent
Seo et al.

(10) Patent No.: US 10,484,096 B2
(45) Date of Patent: Nov. 19, 2019

(54) RELAY APPARATUS AND RELAY METHOD FOR PASSIVE OPTICAL NETWORK

(71) Applicant: LIGHTWORKS TECHNOLOGY INC., Gyeonggi-do (KR)

(72) Inventors: In Shik Seo, Seoul (KR); Joon Hyun Baek, Gyeonggi-do (KR); Sung Hoon Park, Gyeonggi-do (KR); Tae Jong Lee, Gyeonggi-do (KR); Byoung Hoon Bae, Seoul (KR)

(73) Assignee: LIGHTWORKS TECHNOLOGY INC, Seongnam-si (KR)

( * ) Notice: Subject to any disclaimer, the term of this patent is extended or adjusted under 35 U.S.C. 154(b) by 0 days.

(21) Appl. No.: 15/766,115

(22) PCT Filed: Dec. 28, 2015

(86) PCT No.: PCT/KR2015/014355
§ 371 (c)(1),
(2) Date: Aug. 8, 2018

(87) PCT Pub. No.: WO2017/061667
PCT Pub. Date: Apr. 13, 2017

(65) Prior Publication Data
US 2018/0351646 A1    Dec. 6, 2018

(30) Foreign Application Priority Data
Oct. 6, 2015  (KR) ..................... 10-2015-0140421

(51) Int. Cl.
*H04B 10/299*    (2013.01)
*H04B 10/29*    (2013.01)
(Continued)

(52) U.S. Cl.
CPC ........... *H04B 10/29* (2013.01); *H04B 10/299* (2013.01); *H04J 3/062* (2013.01); *H04J 3/0632* (2013.01);
(Continued)

(58) Field of Classification Search
CPC ....... H04B 10/29–299; H04Q 11/0066; H04Q 11/0067
(Continued)

(56) References Cited

U.S. PATENT DOCUMENTS 8,184,987 B2 *  5/2012  Chen ..................... H04J 3/1694
                                                                       359/326
8,472,804 B2 *  6/2013  Trojer ................ H04Q 11/0067
                                                                       398/70
(Continued)

FOREIGN PATENT DOCUMENTS

JP    2008-263652 A    10/2008
JP    2010-534989 A    11/2010
(Continued)

*Primary Examiner* — Li Liu
(74) *Attorney, Agent, or Firm* — Heedong Chae; Lucem, PC

(57) ABSTRACT

Provided are a relay apparatus and a relay method for a passive optical network so as to largely extend a communicable distance while maintaining compatibility with existing network components. In the case of applying an optical relay to the passive optical network, a delay time is reduced by applying the optical relay so that entire transmission delay time considering the increased delay time may be within a preamble period of the upstream burst stream, thereby rapidly increasing a transmission distance of the passive optical network by using the optical relay.

6 Claims, 10 Drawing Sheets

(51) Int. Cl.
*H04Q 11/00* (2006.01)
*H04J 3/06* (2006.01)
*H04L 7/04* (2006.01)

(52) U.S. Cl.
CPC .............. *H04J 3/0652* (2013.01); *H04L 7/04* (2013.01); *H04Q 11/0066* (2013.01); *H04Q 11/0067* (2013.01)

(58) Field of Classification Search
USPC .................... 398/58–72, 154, 155, 173–181
See application file for complete search history.

(56) References Cited

U.S. PATENT DOCUMENTS

| | | | | |
|---|---|---|---|---|
| 9,042,737 B2* | 5/2015 | Tanaka | ................. | H04J 3/0655 398/155 |
| 2009/0208210 A1* | 8/2009 | Trojer | ................. | H04J 3/1617 398/58 |
| 2010/0046941 A1* | 2/2010 | Stadler | ................. | H04B 10/27 398/25 |
| 2010/0111532 A1* | 5/2010 | Chen | ..................... | H04J 3/1694 398/67 |
| 2010/0272436 A1* | 10/2010 | Mizutani | ............. | H04B 10/272 398/25 |
| 2010/0310252 A1* | 12/2010 | Healey | ................. | H04B 10/032 398/6 |
| 2011/0206372 A1* | 8/2011 | Zhou | ................... | H04B 10/272 398/58 |
| 2012/0121265 A1* | 5/2012 | Suvakovic | ........... | H04B 10/272 398/66 |
| 2012/0141139 A1* | 6/2012 | Bakhru | ................ | H04B 10/272 398/158 |
| 2013/0177314 A1* | 7/2013 | Mizuguchi | ........... | H04J 3/0655 398/66 |

FOREIGN PATENT DOCUMENTS

| | | |
|---|---|---|
| KR | 10-2009-0095412 A | 9/2009 |
| KR | 10-2010-0061213 A | 6/2010 |
| KR | 10-2011-0063034 A | 6/2011 |
| KR | 10-2013-0116463 A | 10/2013 |

* cited by examiner

RELAY APPARATUS AND RELAY METHOD FOR PASSIVE OPTICAL NETWORK

CROSS-REFERENCE TO RELATED APPLICATION

This application is based on and claims the benefit of priority to Korean Patent Application No. 10-2015-0140421 filed on Oct. 6, 2015, with the Korean Intellectual Property Office, the disclosure of which is incorporated herein by reference.

TECHNICAL FIELD

The present invention relates to a relay apparatus and a relay method for a passive optical network (PON) and more particularly, to a relay apparatus and a relay method for a PON so as to largely extend a communicable distance while maintaining compatibility with existing network components.

BACKGROUND ART

A passive optical network (PON) technology is to configure a high-speed subscriber network and configured to process simultaneous access of a plurality of subscribers through a time division scheme or a wavelength division scheme. Among the schemes, a cost-effective time division scheme is mainly used, and Ethernet PON (EPON) according to Institute of electrical and electronics engineers (IEEE) 802.3av/ah or gigabit PON (GPON) according to international telecommunication union-telecommunication standardization sector (ITUT) G.984/7 is representative.

In the configuration of such a PON, basically, a single optical line terminal (OLT) installed in a telephone station and a plurality of optical network terminals (ONTs) or optical network units (ONUs) have a point to multipoint network structure through a remote node (using an optical splitter) which is a passive optical divider.

FIG. 1 shows a configuration of a general PON, and as shown in FIG. 1, an OLT 1 having an optical transceiver 1a for converting an electric signal and an optical signal to each other is connected with a plurality of subscriber ONTs 2 through a remote node RN, and each ONT 2 also has an optical transceiver 2a.

In the PON structure configured above, a transmission distance between the OLT of the telephone station and the ONT of the subscriber is generally within about 20 Km, and in the case of not a large city, since a service is often not provided due to the lack of the number of subscribers according to the transmission distance limit of 20 Km, a method of extending the transmission distance by installing a plurality of telephone stations or installing a branch station has been used.

FIG. 2 shows a configuration of using a branch station to extend the transmission distance of the PON.

As shown in FIG. 2, a branch station 11 is configured within a distance (20 Km) that can be transmitted through a telephone station 10 and the corresponding branch station 11 operates as a new OLT and connected to the subscriber ONT 2 within 20 Km.

Therefore, when such a method is used, the transmission distance is doubled, but the economical efficiency is low because the cost for installing the branch station 11 and the cost for operating the branch station 11 are excessive.

That is, in the case of the telephone station 10 or the branch station 11, since an operator and a waiter need to reside and the communication data is recovered and then transmitted again, the installation cost is extremely high and the operation cost is excessively increased.

Therefore, efforts are being made to increase the transmission distance by another method. For example, although the transmission distance may be extended by increasing a signal output and lowering reception sensitivity, there is a problem that there is a limitation in increasing the output and sensitivity of an optical transceiver, the extension of the transmission distance is also behind the expectations, and the cost is excessive because the quality of the optical transceiver configured in the ONT of each subscriber needs to be increased.

Another method is a method using a relay, and methods using an optical relay of configuring an optical amplifier amplifying a transmitted optical signal itself on a line or an optical electric optical (O-E-O) method of converting a received optical signal to an electrical signal and converting the electrical signal to the optical signal again are representative.

However, since an optical amplifier that amplifies the optical signal of an optical fiber to which a broadband optical signal is transmitted as a whole is very expensive, the cost is expensive, and the optical relay is economical because the cost is relatively inexpensive. However, since a transmission packet is damaged by a delay in the converting process, there is a limitation that it is difficult to be applied at gigabit or higher.

In Korean Patent Publication No. 10-2011-0063034, there is disclosed "a relay apparatus and a relay method of a gigabit passive optical network" which converts an optical signal transmitted while using an optical relay into an electrical signal and then modulates the corresponding signal to analyze frame data, and confirms control information on an upstream burst signal, recovers and modulates the upstream burst signal transmitted according to the corresponding control signal, and then newly reconfigures the upstream burst signal to relay the recovered upstream burst signal as a continuous signal, thereby solve a delay problem generated in the optical relay. However, in this case, the frame modulation for recovering the transmitted signal and an analysis configuration for signals of the entire frame for confirming the control information on the upstream burst signal are required, and as an operation load increases, FPGA or dedicated ASIC is required to provide complex logic functionality required to configure the same function. In the case of implementing the configuration, since the economical efficiency is low and the upstream burst signal is reconfigured into a new continuous signal unlike a standard, the OLT receiving the upstream burst signal needs to be modified to correspond to the changed signal, and thus, there is a limitation in that the existing OLT cannot be used.

Accordingly, there is a growing need for an optical relay in which a stable transmission distance can be extended even while the PON components that are already configured are used themselves and the configuration cost and the operation load are low.

PRIOR ART DOCUMENT

[Patent Document]
(Patent Document 1) Korean Patent Publication No. 10-2011-0063034 [Title of the Invention: Relay apparatus and relay method of gigabit passive optical network]

DISCLOSURE

Technical Problem

An object of the present invention is to provide an optical electric optical (OEO) optical relay for a passive optical network in which a delay for converting an optical signal into an electrical signal or converting an electrical signal into an optical signal, or a delay for detecting a clock from a burst signal occurs, in which a signal delay element due to additional optical-electrical conversion and electrical-optical conversion may be doubled. Therefore, an object of the present invention is to provide a method of minimizing a delay time of an optical-electrical conversion optical relay by providing a structure of proactively transmitting preamble bit strings and by the optical-electrical conversion optical relay method and a frame by an asynchronous method. In particular, an object of the present invention is to provide a relay apparatus and a relay method for a passive optical network so as to use general network components as they are by reducing a delay time while using a standard signal frame which is actually transmitted.

Another object of the present invention is to provide a relay apparatus and a relay method for a passive optical network which proactively provides an upstream burst frame data preamble according to a detecting result of a signal detector that detects reception of the upstream burst signal earlier than an optical-electrical conversion delay time or determines an end point of the upstream burst frame data through continuity of '0' or '1', and predicts a start point of a subsequent upstream burst signal by considering a standard guard time period for protecting the upstream burst signal to proactively provide an upstream burst frame data preamble, thereby minimizing a delay time.

Yet another object of the present invention is to provide a relay apparatus and a relay method for a passive optical network which synchronizes a clock for each ONT of an upstream burst signal transmitted to the OLT by an optical relay of the passive optical network to improve burst mode clock data recovery (BCDR) of the OLT, thereby improving performance of the entire system.

Still another object of the present invention is to provide a relay apparatus and a relay method for a passive optical network which configure a delay reduction optical relay to reduce delays of the signal detector detecting the optical signal and the optical relay only using an asynchronous first in first out (FIFO) buffer for data processing, thereby minimizing increases in cost and operation load and enhancing economics.

Technical Solution

An embodiment of the present invention provides a relay apparatus for a passive optical network as an apparatus of relaying optical signals of an optical line terminal (OLT) and an optical network terminal (ONT) using a pair of optical transceivers, the relay apparatus including: a signal detector that detects presence or absence of an upstream burst signal earlier than an electrical signal generation preparation time of the optical transceiver connected with the ONT; a burst mode clock data recovery (BCDR) unit that recovers a clock and data from an upstream burst signal received to the optical transceiver and converted into an electrical signal by an optical-electrical conversion function; a clock data recovery (CDR) unit that recovers an OLT clock and data from a downstream continuous signal received by the optical transceiver connected to the OLT and converted into an electrical signal through an optical-electrical conversion function; an asynchronous buffer unit that stores an upstream burst signal using the clock recovered by the BCDR unit as an input clock and outputs the stored signal using the clock recovered by the CDR unit as an output clock; and a control unit that proactively generates an upstream burst frame preamble in accordance with the OLT clock recovered by the CDR unit when the upstream burst signal is detected by the signal detector, selects upstream burst frame data subsequent to the upstream burst frame preamble proactively generated when the recovered upstream burst frame data is stored in the asynchronous buffer unit from the asynchronous buffer unit to provide the selected upstream burst frame data to the optical transceiver connected with the OLT according to the OLT clock.

As one example associated with the present invention, the control unit may configure upstream burst frame data to be transmitted by considering a preamble of the recovered upstream burst frame data stored in the asynchronous buffer unit and the proactively generated preamble.

As one example associated with the present invention, the control unit may determine an endpoint of the upstream burst frame data through continuity of '0' or '1' and predict a start point of a subsequent upstream burst signal by considering a standard guard time for protecting the upstream burst signal to proactively provide an upstream burst frame data preamble.

Another embodiment of the present invention provides a relay apparatus for a passive optical network as an apparatus of relaying optical signals of an OLT and an ONT using a pair of optical transceivers, the relay apparatus including: a control unit that recovers an OLT clock from a downstream continuous signal to determine a clock of an upstream burst signal transmitted to the OLT, generates proactively an upstream burst frame preamble before the recovery of the clock and the data of the corresponding signal when the upstream burst signal is detected or predicted by a signal pattern to output the generated upstream burst frame preamble to the determined clock, and outputs all or some of the received upstream burst frame data when the upstream burst frame data is received through the burst mode clock and the data recovery as the determined clock subsequent to the upstream burst frame preamble which is proactively generated and output in advance.

As one example associated with the present invention, the relay apparatus may further include a signal detector that detects the upstream burst signal earlier than an electrical signal generation preparation time of the optical transceiver to provide the detected upstream burst signal to the control unit.

As one example associated with the present invention, the control unit may determine an endpoint of the upstream burst frame data through continuity of '0' or '1' and predict a start point of a subsequent upstream burst signal by considering a standard guard time for protecting the upstream burst signal to proactively provide an upstream burst frame data preamble.

Yet another embodiment of the present invention provides a relay method for a passive optical network using an apparatus of relaying optical signals of an OLT and an ONT using a pair of optical transceivers, the relay method including: recovering, by a CDR unit configured in the relay apparatus, OLT clock data from a downstream continuous signal received by the optical transceiver connected to the OLT; providing, by a control unit configured in the relay apparatus, a proactive upstream burst frame preamble generated according to the OLT clock recovered by the CDR unit to the OLT-side optical transceiver when the upstream burst signal received by the optical transceiver connected with the ONT is detected or predicted by a signal pattern; recovering, by a BCDR unit configured in the relay apparatus, clock data from the upstream burst signal received by the optical transceiver and storing, by an asynchronous buffer unit, the recovered upstream burst frame data using the clock recovered by the BCDR unit as an input clock and the clock recovered by the CDR unit as an output clock; and selecting, by the control unit, all or some of the recovered upstream burst frame data stored in the asynchronous buffer unit to provide the selected upstream burst frame data to the optical transceiver connected with the OLT according to the OLT clock subsequent to the proactively generated upstream burst frame preamble.

As one example associated with the present invention, in the providing of the recovered upstream burst frame data to the optical transceiver connected with the OLT, the control unit may configure upstream burst frame data to be transmitted by considering a preamble of the recovered upstream burst frame data stored in the asynchronous buffer unit and the proactively generated preamble.

As one example associated with the present invention, in the detecting of the upstream burst signal received by the optical transceiver connected with the ONT, the control unit configured in the relay apparatus may detect the upstream burst signal received by a signal detector of the relay apparatus that detects the presence of the upstream burst signal earlier than the electrical signal generation preparation time of the optical transceiver.

As one example associated with the present invention, in the detecting of the upstream burst signal received by the optical transceiver connected with the ONT, the control unit configured in the relay apparatus may determine an endpoint of the upstream burst frame data through continuity of '0' or '1' and predict a start point of a subsequent upstream burst signal by considering a standard guard time for protecting the upstream burst signal.

Advantageous Effects

According to the present invention, in the case of applying an optical relay to the passive optical network, a delay time is reduced by applying the optical relay so that entire transmission delay time considering the increased delay time may be within a preamble period of the upstream burst stream, thereby rapidly increasing a transmission distance of the passive optical network by using the optical relay.

Further, according to the present invention, the delay time generated in the optical relay may be reduced without modification of the upstream burst frame data to use components OLT and ONT (ONU) of the passive optical network which are used in advance without modification as they are, thereby enhancing applicability and compatibility.

Further, according to the present invention, since the optical relay provides the clock of the upstream burst frame data as a clock of the OLT, burst mode clock data recovery performance of the OLT may be improved, thereby compensating a delay time delayed by the optical relay.

Further, according to the present invention, the modification of the configuration of the existing optical relay is minimized and an operation load is also minimized, thereby enhancing economics for increasing a transmission distance.

DETAILED DESCRIPTION OF THE PREFERRED EMBODIMENT

Figure 1:
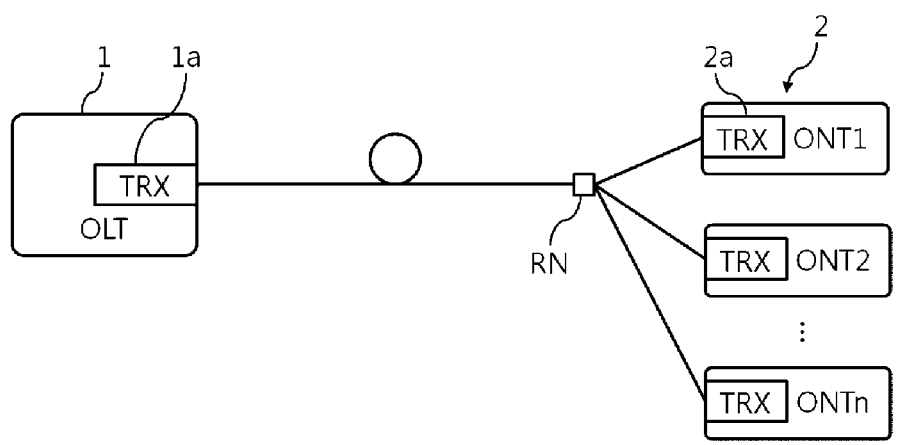
FIG. 1 is an exemplary diagram showing a configuration of a passive optical network in the related art.
Figure 2:
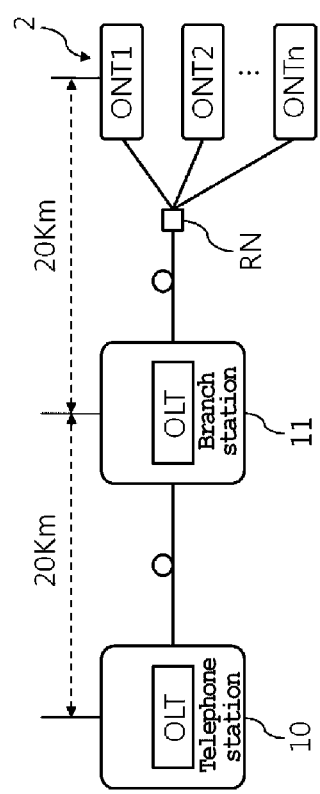
FIG. 2 is an exemplary diagram showing an example of a transmission distance extension method of the passive optical network in the related art.

Technical terms used in the present invention are used only to describe specific embodiments, and are not intended to limit the present invention. Further, unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art.

In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included. Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present invention.

Hereinafter, embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present disclosure. Further, it is noted that the accompanying drawings are only for easily understanding the spirit of the present invention and it should not be interpreted that the spirit of the present invention is limited by the accompanying drawings.

In particular, in the description of the present invention, since a subscriber optical communication terminal is referred to as an optical network terminal (ONT), but the ONT is used as a meaning of representing the subscriber optical communication terminal including an optical network unit (ONU) which is the same concept, the ONT should be interpreted to include a different type of optical communication modem or optical communication terminal device including the ONU.

First, in order to describe a passive optical network (PON) relay apparatus according to an embodiment of the present invention, limitations caused by extension of a transmission distance of a PON capable of high-speed communication above gigabit will be described.

Figure 3:
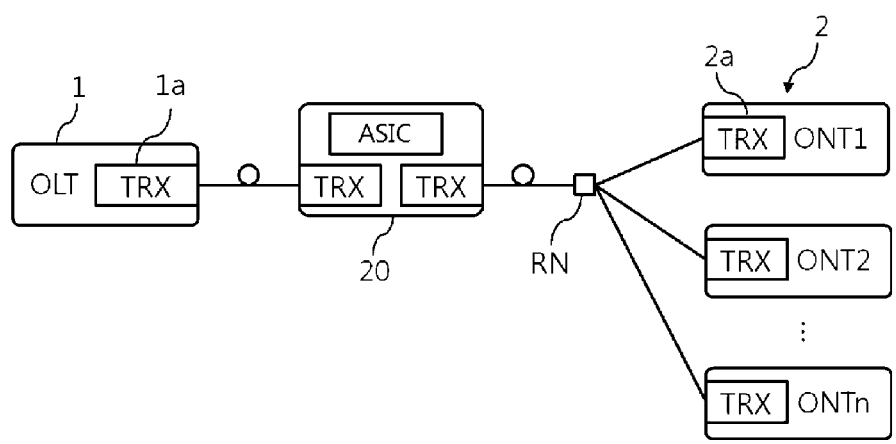
FIG. 3 is a configuration diagram showing a configuration of extending a transmission distance of the passive optical network using an optical relay.

FIG. 3 is a configuration diagram showing a configuration of extending a transmission distance of the PON using an optical relay. As illustrated In FIG. 3, a general optical relay 20 receives a downstream signal, which is transmitted to an ONT 2 by an optical line terminal (OLT) 1 through an optical transceiver 1a, through the optical transceiver connected to the OLT side to convert an optical signal into an electrical signal and converts and outputs the electrical signal into the optical signal through the optical transceiver connected with the ONT side. The downstream signal relayed by the optical relay 20 is transmitted to the optical transceiver 2a constituted in the ONT 2 through a remote node RN and the corresponding optical transceiver 2a converts the corresponding downstream signal into the electrical signal.

On the contrary, the ONT 2 provides an upstream burst signal to the ONT-side optical transceiver of the optical relay 20 through the optical transceiver 2a, and the corresponding ONT-side optical transceiver converts the corresponding optical signal into an electrical signal and then the OLT-side optical transceiver converts the electrical signal into the optical signal to transmit the converted optical signal to the optical transceiver 1a of the OLT 1, and the optical transceiver 1a of the OLT 1 converts the transmitted optical signal into the electrical signal.

The communication using the PON is provided as a continuous signal in the case of the downstream signal, but is provided as a burst signal in the case of the upstream signal.

In the case of the PON, since the downstream signal and the upstream signal transmitted between the OLT 1 and the ONT 2 are 1:N communication using a single optical line, different types of signal management and synchronization are required, and the upstream signal needs to be considered to avoid signal collision between N ONTs 2 by such a characteristic.

Figure 4:
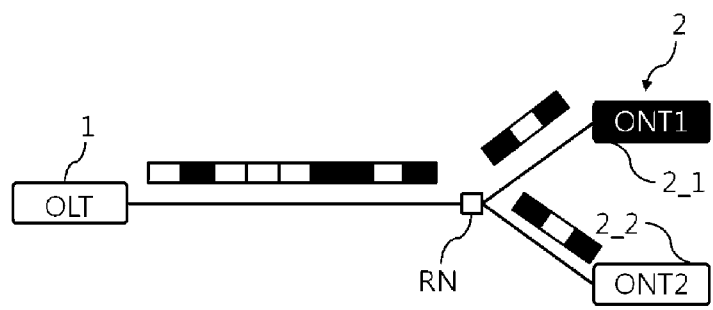
FIG. 4 is a schematic diagram for describing a downstream signal transmission method of the passive optical network.

FIG. 4 is a schematic diagram for describing a downstream signal transmission method of the passive optical network, and as illustrated in FIG. 4, when the OLT 1 continuously transmits downstream frame data to be transmitted to the ONT 2, a plurality of ONTs 2_1 and 2_2 selects and receives self-frame data from the downstream frame data. Accordingly, such a downstream signal can be continuously transmitted without signal collision by continuously transmitting a signal modulated by the OLT 1 with its own clock. In addition, since all the downstream signals including the continuous data use the clock of the OLT 1, each ONT 2 needs to recover and synchronize the clocks for the downstream signal only once.

However, in the case of an upstream signal in which the ONT 2 transmits the upstream frame data to the OLT 1, since there is a possibility of collision of the signal if the plurality of ONTs 2_1 and 2_2 arbitrarily transmit the upstream signal, when the OLT 1 which knows information (the number, a distance, etc) on the ONT 2 transmits control information on a transmission time and a data amount of the upstream signal to the each ONT 2 through the downstream signal, each ONT 2_1 or 2_2 generates upstream burst frame signals having various sizes based on the corresponding control information to transmit the upstream burst frame signals without collision.

Figure 5:
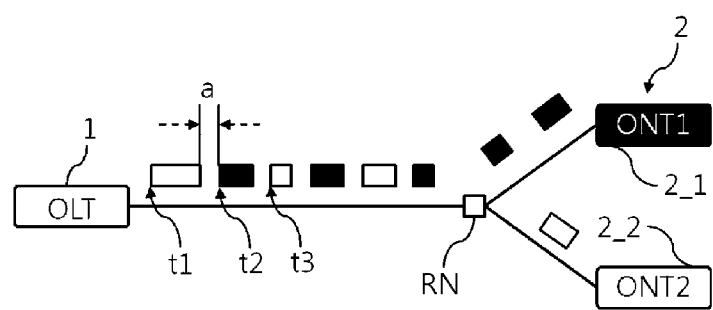
FIG. 5 is a schematic diagram for describing an upstream signal transmission method of the passive optical network.

FIG. 5 is a schematic diagram for describing an upstream signal transmission method of the PON, and as illustrated in FIG. 5, the ONTs 2_1 and 2_2 generate upstream signals in a predetermined data amount at different times to transmit the generated upstream signals to the OLT 1, and each upstream signal is divided into some guard periods a to prevent collision.

As illustrated in FIG. 5, such an upstream signal is a burst signal in which the signal is continuously segmented, and since each signal uses its own clock of each of the ONTs 2_1 and 2_2, the clocks of the upstream burst signal are not synchronized with each other or with the OLT clock and thus, there is a deviation from the clock of the OLT 1 receiving the clocks.

That is, as illustrated in FIG. 5, since t1, t2, and t3, which are individual start timings of the upstream burst signal, has a difference from the clock of the OLT 1, the OLT 1 recovers the clock for each of the upstream burst signal and need to recover the data.

As a result, in order to receive the upstream burst signal provided by the ONT 2, the OLT 1 converts the electric signal into an optical signal in accordance with the ONT 2 control timing, receives the upstream burst signal transmitted through the optical line, converts the received upstream bust signal into the electrical signal again, and then performs the burst mode clock and the data recovering method, thereby confirming the upstream frame data.

In each of these individual processes, a predetermined processing delay occurs, and in the case of the gigabit PON, a large part of the preamble of the frame data to be transmitted is lost due to the processing delay.

Figure 6:
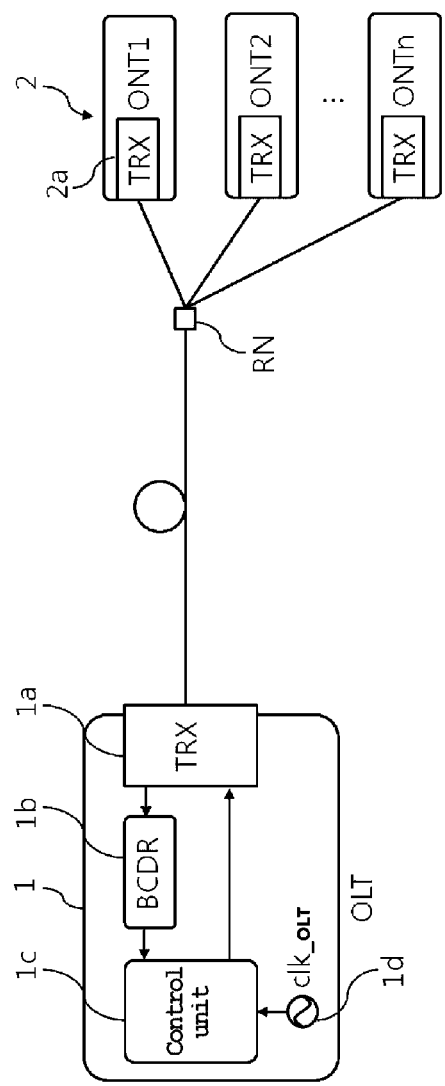
FIG. 6 is a configuration diagram for describing a transmission delay element of a gigabit passive optical network.

FIG. 6 is a configuration diagram for describing a transmission delay element of a gigabit passive optical network, and as illustrated in FIG. 6, internal components of the ONT 2 and the OLT 1 generating a delay in the upstream signal transmission process using the PON are partially illustrated.

The ONT 2 includes an optical transceiver 2a that converts an electrical signal of the upstream burst frame data into an optical signal in accordance with a control timing and transmits the converted optical signal through an optical line. The optical transceiver 2a requires a LD turn on time that converts the electrical signal into the optical signal. That is, a delay corresponding to an optical signal generation preparation time (Optical TX on Time) occurs.

The optical signal converted by the optical transceiver 2a of the ONT 2 is transmitted to the optical transceiver 1a of the OLT 1 by the optical line, and the optical transceiver 1a of the OLT 1 requires a time (PD Turn On time) when a photo diode receiving the optical signal converts the optical signal into the electrical signal. That is, a delay corresponding to an electrical signal generation preparation time (Electric Rx On Time) occurs.

Further, since the delay-converted upstream burst signal uses a clock used by any ONT 2 different from a clock clk$_{OLT}$ 1*d* used by the OLT 1, in order confirm reception frame data by recovering an arbitrary ONT clock applied to the corresponding signal, the upstream burst signal is provided to a burst mode clock and data recovery (BCDR) unit 1*b* and the BCDR unit 1*b* consumes a predetermined time for clock recovery. Accordingly, the a control unit 1*c*, for example, an application specific integrated circuit (ASIC) or field programmable gate array (FPGA) which takes charge of control and signal processing may receive the upstream frame data only after the operation of the BCDR unit 1*b* for the clock recovery.

Figure 7:
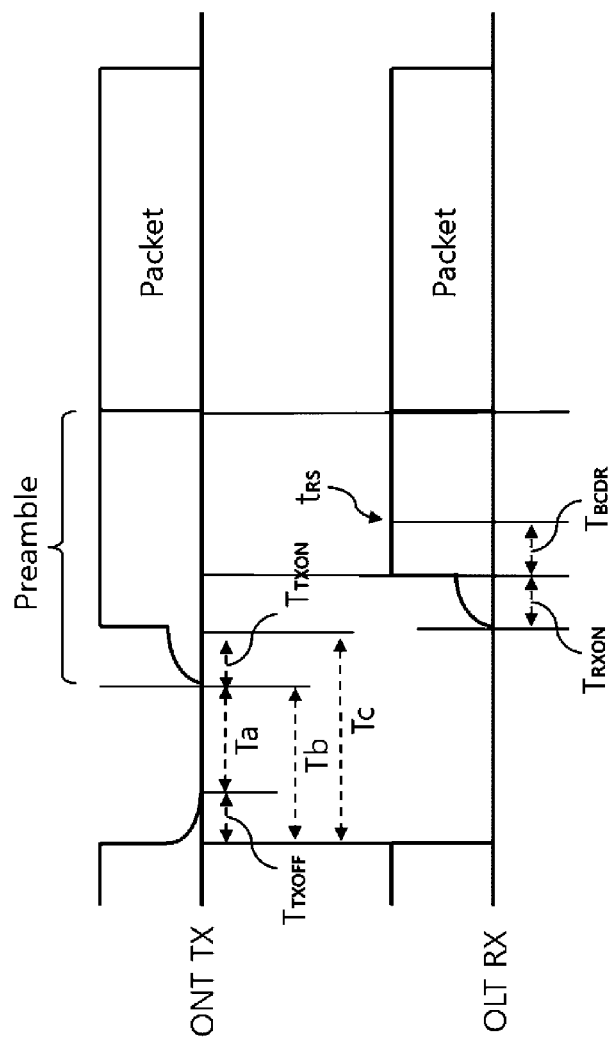
FIG. 7 is a signal diagram for describing a transmission delay of the gigabit passive optical network.

FIG. 7 is a signal diagram for describing a transmission delay of the gigabit PON. As illustrated in FIG. 7, the upstream burst frame data transmitted by the ONT is configured by a preamble (repetition of 1 and 0) and an actual packet, and in the case of performing actual transmission with a guard period Tb, a delay of the time when the laser diode of the optical transceiver is turned on, that is, the optical signal generation preparation time T$_{TXON}$ occurs and a timing when the optical signal is transmitted to the actual optical line needs to pass a time of Tc after the existing signal ends. Actually, since the laser diode of the optical transceiver also requires a turn-off time T$_{TXOFF}$, a period where there is no signal on the actual optical line corresponds to Ta.

Meanwhile, the transmitted upstream burst frame data is received by the optical transceiver of the OLT and converted into the electric signal from the optical signal. At this time, a delay of a time required for generating an effective electric signal in the photodiode, that is, an electrical signal generation preparation time T$_{RXON}$ occurs, and subsequently, a delay of a burst mode clock data recovery time T$_{BCDR}$ occurs. Accordingly, a time at which the OLT may substantially confirm the upstream frame data becomes t$_{RS}$.

As a result, when the upstream frame data is transmitted, the delays of the optical signal generation preparation time, the electrical signal generation preparation time, and the BCDR time occur, and this means that only when these delays are completed within the preamble period of the upstream frame data, the substantial frame data packet may be received without an error.

For example, if the optical signal generation preparation time, the electrical signal generation preparation time, and the BCDR time are all 12.8 ns in the gigabit PON communication, a total delay of 38.4 ns occurs. Generally, since the preamble (repetition of 1 and 0) constituting the upstream frame data is set to about twice the actual delay in consideration of a change in a network environment such as delay or loss, a preamble period of 76.8 ns may be set. In using EPON with a transmission rate of 1.25 Gbps, for example, using 96 bits at a preamble period because one bit is 0.8 ns, the preamble period is 76.8 ns and only when an expected required delay is half the preamble period, stable communication is ensured.

Figure 8:
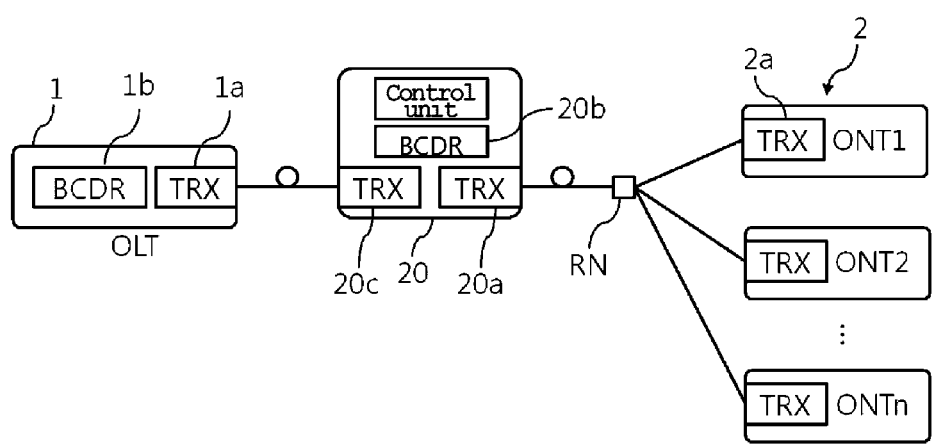
FIG. 8 is a configuration diagram for describing a transmission delay in the case of applying an optical relay to the gigabit passive optical network.

FIG. 8 is a configuration diagram for describing a transmission delay in the case of applying an optical relay to the gigabit passive optical network. The optical relay 20 includes an optical transceiver 20*a* that converts an upstream burst signal transmitted by the ONT 2 into an electrical signal, a BCDR unit 20*b* that recovers the clock and data from the upstream burst signal received by the optical transceiver 20*a*, an optical transceiver 20*c* that converts the recovered data into the electrical signal again to transmit the converted data to the OLT 1, and a control unit that manages the optical signal relaying process.

As a result, when the optical relay 20 is applied to increase the transmission distance of the existing PON, the delay time is doubled because the optical transceivers 20*a* and 20*c* and the BCDR unit 20*b* which are the delay generation components described above are added.

That is, an optical signal generation preparation time for converting the upstream frame data into an upstream burst signal through the ONT optical transceiver 2*a* by the ONT 2, an electrical signal generation preparation time for converting the optical signal into an electrical signal by the optical transceiver 20*a* of the optical relay 20 receiving the corresponding upstream burst signal, a BCDR time for recovering a clock and data by the BCDR unit 20*b* receiving the converted electrical signal, an optical signal generation preparation time of the optical transceiver 20*c* converting the recovered data into the optical signal to be transmitted to the OLT 1, an electrical signal generation preparation time for converting the optical signal into the electrical signal by the optical transceiver 1*a* of the OLT 1 receiving the corresponding optical signal, and a BCDR time for recovering a clock and data by the BCDR unit 1*b* receiving the converted electrical signal are required.

Assuming that all the delay times are 12.8 ns, when the optical relay 20 is applied, the delay occurs six times until the OLT 1 receives the upstream burst frame data, the delay becomes 76.8 ns.

As a result, such a configuration consumes all the preamble periods set to twice the expected delay for general PON communication, and actually, normal communication becomes difficult in such a case. In particular, since the optical relay 20 is used to extend the distance, a time delay occurs due to the distance, so that the actual delay exceeds 76.8 ns. In this case, retransmission due to packet damage is repeated, and substantial communication becomes impossible.

That is, when the optical relay 20 is configured in a general PON to extend the transmission distance, packets of the transmission frame data are damaged due to a transmission delay for transmitting the uplink burst signal, and thus, it is impossible to extend the transmission distance simply by applying the optical relay 20 without changing the component of the PON pre-used.

In the embodiment of the present invention, there is an optical relay apparatus capable of extending a transmission distance while the OLT or the ONT which is the component of the existing PON communication is used as it is and the upstream frame data is also used as it is without a change. Particularly, for the optical relay, the control information of the downstream frame data is analyzed or the transmission method is not modified differently from the standard so that a load increase may be suppressed and the compatibility may be maintained.

Figure 9:
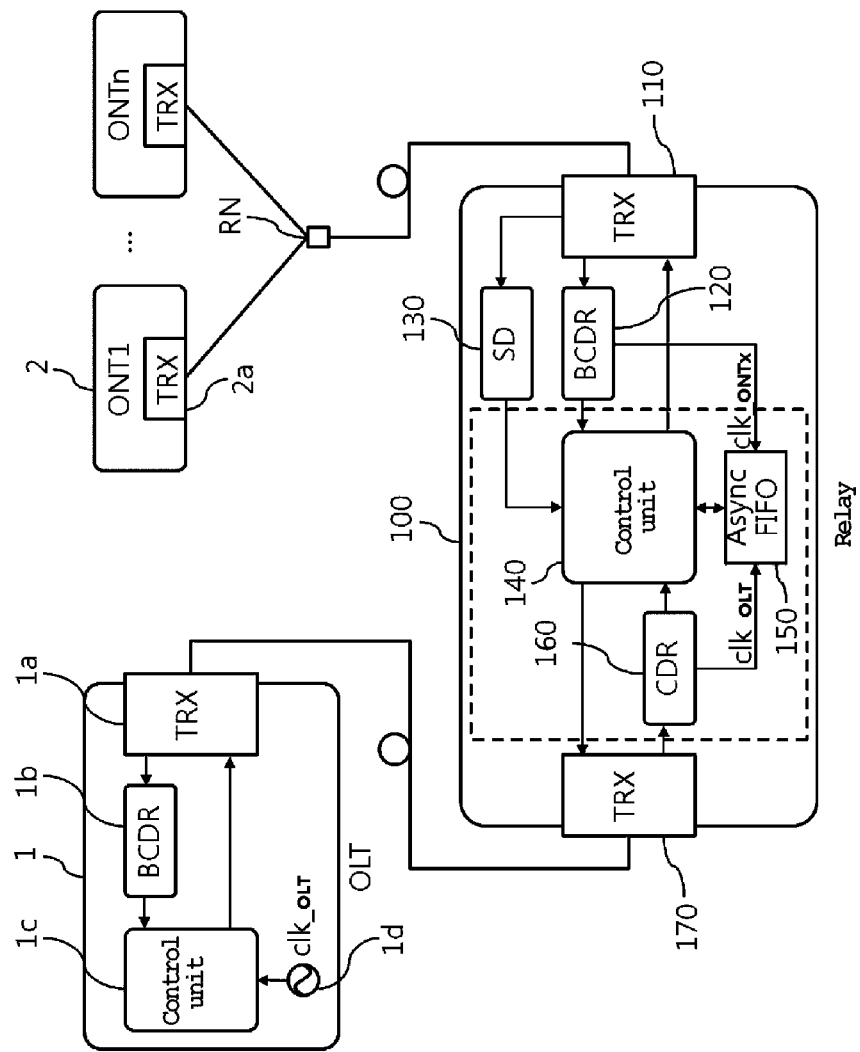
FIG. 9 is a system configuration diagram showing a configuration of a relay apparatus and a configuration of a passive optical network applying the relay apparatus according to an embodiment of the present invention.

FIG. 9 is a system configuration diagram showing a configuration of a relay apparatus according to an embodiment of the present invention and a configuration of a passive optical network to which the relay apparatus is applied. As illustrated in FIG. 9, the ONT 2 including the optical transceiver 2*a* and the OLT 1 including the BCDR unit 1*b* of the optical transceiver 1*a* and the control unit 1*c* operating by the local clock clk$_{-OLT}$ 1*d* are the same as those in the related art.

The optical relay 100 according to the embodiment of the present invention which is configured between the existing OLT 1 and ONT 2 to extend a transmission distance includes a pair of optical transceivers 110 and 170 connected with the ONT 2 and the OLT 1, respectively, a signal detector 130 that detects presence or absence of an upstream burst signal by the optical transceiver 110 connected with the ONT, a BCDR unit 120 that recovers a clock and data from the upstream burst signal (electrical burst signal) received by the optical transceiver 110 and converted into an electrical signal through an optical-electrical conversion function, a CDR unit 160 that recovers an OLT clock and data from a downstream continuous signal received by an optical transceiver 170 connected to the OLT and converted into an electrical signal through an optical-electrical conversion function, an asynchronous buffer unit 150 that stores an upstream burst signal using the clock recovered by the BCDR unit 120 as an input clock and outputs the stored signal using the clock recovered by the CDR unit as an output clock, and a control unit 140 that proactively generates an upstream burst frame preamble in accordance with the OLT clock recovered by the CDR unit 160 when the upstream burst signal is detected by the signal detector 130, selects upstream burst frame data subsequent to the upstream burst frame preamble proactively generated when the upstream burst frame data recovered in the asynchronous buffer unit 150 is stored from the asynchronous buffer unit 150 to provide the selected upstream burst frame data to the optical transceiver connected with the OLT according to the OLT clock. Here, the control unit 140, the CDR unit 160, and the asynchronous buffer unit 150 may be configured as an ASIC or an FPGA as indicated by a dotted line.

Substantially, the signal detector 130 is a dedicated device that can detect the optical signal received by the optical transceiver 110 as quickly as possible, and detects reception of the optical signal earlier than a photoelectric conversion rate of a photodiode of the optical transceiver 110, that is, the electrical signal generation preparation time. For example, if the electrical signal generation preparation time is 12.8 ns, the signal detector 130 preferably detects the reception of the upstream burst signal at a rate of 5 ns or less.

According to the rapid detection of the upstream burst signal, the control unit 140 proactively generates a preamble (repetition of 1 and 0) of the upstream burst frame before the optical transceiver 110 converts the optical signal into the electrical signal or the subsequent BCDR unit 120 recovers the clock and the data of the upstream burst signal to transmit the generated preamble to the optical transceiver 170 of the OLT side. At this time, the used clock uses an OLT-side clock $clk_{\_OLT}$ known through the clock recovery of the downstream frame data before knowing a clock $clk_{\_ONTx}$ of the upstream burst signal transmitted by any ONT.

Further, in order to predict an end point of a certain upstream burst frame, the control unit 140 determines the end point of the upstream burst frame data through continuity of '0' or '1' and predicts a start point of a subsequent upstream burst signal by considering a standard guard time for protecting the upstream burst signal to proactively provide an upstream burst frame data preamble. Even in this case, the proactively generated upstream burst frame data preamble uses the OLT-side clock $clk_{\_OLT}$.

For example, the control unit 140 predicts an end point of the frame when a signal of '0' or '1' is continuously detected at any level or more by decoding 8 B/1 B (1 G EPON) and 64 B/66 B (10 G EPON) used in the EPON and predicts that the upstream frame starts when a predetermined guard time period is passed from the end point of the frame to proactively generate a preamble of the upstream burst frame.

That is, the proactive upstream burst frame data preamble may be proactively generated by predicting the detections signal of the signal detector 130 or the proactive upstream burst frame end point and the standard guard period (predicting a signal pattern), and one of these criteria may be used or an AND combination thereof may also be used.

When the proactively generated upstream burst frame preamble is transmitted to the OLT side using the OLT clock, the upstream burst signal may be relayed only by the delay by the signal detector 130 and the optical signal generation preparation time delay by the optical transceiver 170 at the OLT side other than the delay by the optical relay 100. For example, if the delay of the delay element is 12.8 ns and the delay of the signal detector 130 is 5 ns, the delay by the optical relay 100 becomes 17.8 ns, and thus, the delay by the existing general optical relay of 38.4 ns may be reduced to a half or less. Accordingly, if the predetermined preamble period is 76.8 ns, even though the delay of 17.8 ns generated in the optical relay 100 is added to the delay of 38.4 ns generated in the ONT and the OLT to become 56.2 ns, a margin of 20.6 ns may be maintained in a predetermined preamble period and thus, normal communication is possible.

Meanwhile, while the preamble of the upstream burst frame is proactively transmitted, the actual upstream burst signal is converted into an electrical signal through the ONT-side optical transceiver 110 and then the clock and upstream burst frame data are recovered in the BCDR unit 130, and the recovered upstream burst frame data is stored in an asynchronous buffer unit 150 (an asynchronous first in first out (FIFO) illustrated in the drawing) using the recovered clock $clk_{\_ONTx}$ as an input clock.

The control unit 140 generates a proactively predetermined preamble and then provides the upstream burst frame data recovered in the asynchronous buffer unit 150 to the OLT-side optical transceiver 160 according to the OLT clock so as to configure the upstream burst frame data to be transmitted by considering the preamble of the recovered upstream burst frame data stored in the asynchronous buffer unit 150 and the proactively generated preamble, thereby relaying the upstream burst signal to be transmitted to the OLT 1. The control unit 140 may omit some preambles (reduce an OLT reception delay) from the recovered upstream burst frame data stored in the asynchronous buffer unit 150, and may not omit the preamble at all or rather add a preamble (improve OLT reception stability).

For example, if the electrical signal generation preparation time of the ONT-side optical transceiver 110 is 12.8 ns, the clock recovery time through the BCDR unit 120 is 12.8 ns, and the detection time of the signal detector 130 is 5 ns, the control unit 140 proactively transmits the upstream burst frame preamble from 20.6 ns before recovering the actual upstream burst frame data. During the optical signal generation preparation time of the OLT-side optical transceiver 170, the preamble is not actually converted into the optical signal, and thus, the proactively generated preamble may be used as if the OLT-side optical transceiver 170 is preheated and may be used for compensating for the preamble that is lost until the signal detector 130 detects the signal and the BCDR unit 120 recovers the clock.

In this way, since the optical relay 100 proactively outputs the upstream burst signal as soon as the upstream burst signal is detected by the signal detector 130, the delay in the optical relay 100 may be substantially minimized, and the possibility of packet damage due to the loss of the packet may be fundamentally prevented. In particular, since an excessive load such as analyzing the frame data or reconfiguring new frame data is not generated for the reliable relay of the optical relay 100, the configuration of the control unit 140 may be simplified, and a cost increase factor may be minimized as compared with an optical relay which is generally used. That is, in terms of economics, the optical relay may provide an excellent advantage as compared with using an optical amplifier or a branch station, and above all, in the case of using the optical relay 100 according to the embodiment of the present invention, the existing PON communication components OLT and ONT may be used as they are without any modification, thereby enhancing compatibility.

In particular, since the clock of the upstream burst signal that is transmitted to the OLT 1 by the optical relay 100 is the local clock clk$_{\_OLT}$ of the OLT, it is possible to maximize the clock recovery performance of the BCDR 1b of the OLT 1 and reduce the delay time generated in the OLT 1. Accordingly, since the delay generated in the optical relay 100 may be partially compensated, the total delay time described above is further reduced, thereby improving the system stability.

Figure 10:
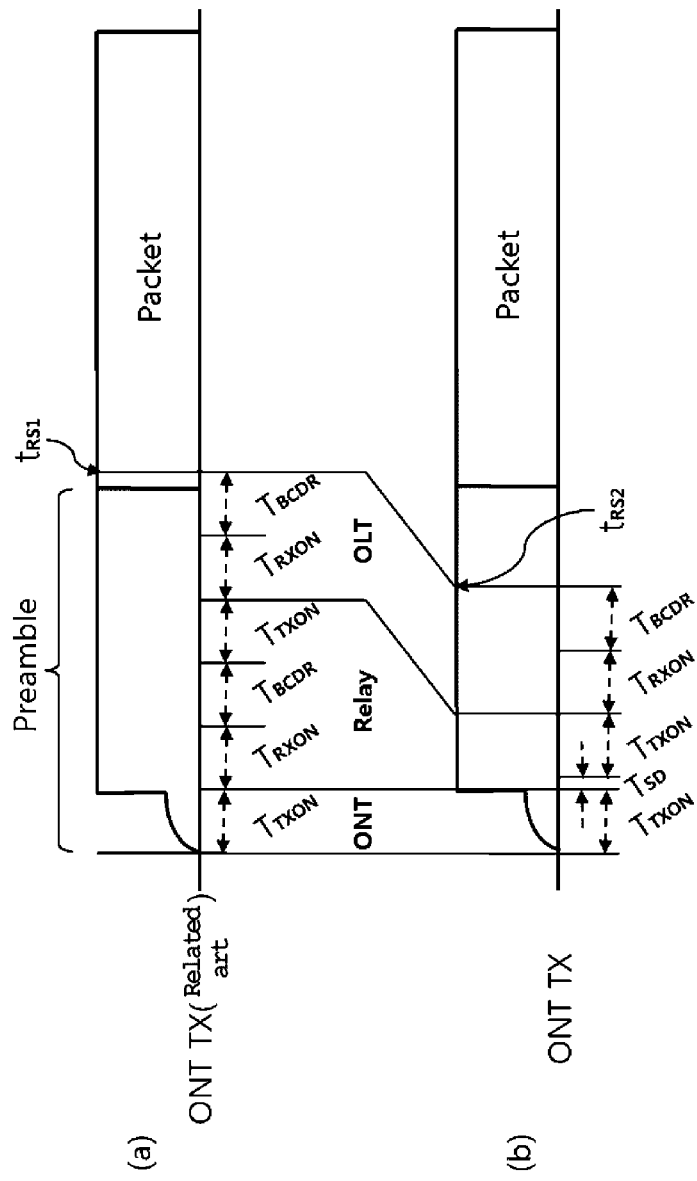
FIG. 10 is a schematic diagram for describing a difference in delay time between a case of using the relay apparatus according to the embodiment of the present invention and a case of using an optical relay in the related art.

FIG. 10 is a schematic diagram for describing a difference in delay time between a case of using the relay apparatus according to the embodiment of the present invention and a case of using an optical relay in the related art. As illustrated in FIG. 10, in the case of using an existing optical relay, ONT upstream burst frame data (FIG. 10A) generates a delay more than the preamble period by at least six delays (the optical signal generation preparation time $T_{TXON}$ of the ONT, the electrical signal generation preparation time $T_{RXON}$ of the optical relay, the burst mode clock data recovery time $T_{BCDR}$ of the optical relay, the optical signal generation preparation time $T_{TXON}$ of the optical relay, the electrical signal generation preparation time $T_{RXON}$ of the OLT, and the burst mode clock data recovery time $T_{BCDR}$ of the OLT) and a network environment change (an additional delay added to each delay time) to cause the damage of the packet (the data recovery time $t_{RS1}$ of the OLT exceeds the preamble period). On the other hand, in the case of using the optical relay according to the embodiment of the present invention, ONT upstream burst frame data (FIG. 10b) actually adds only one additional delay (the optical signal generation preparation time $T_{TXON}$ of the optical relay) and a short delay $T_{SD}$ of the signal detector in addition to three delays (the optical signal generation preparation time $T_{TXON}$ of the ONT, the electrical signal generation preparation time $T_{RXON}$ of the OLT, and the burst mode clock data recovery time $T_{BCDR}$ of the OLT) by the PON communication component, and thus, an actual data recovery time $t_{RS2}$ of the OLT stably becomes within a preamble period. Particularly, since the clock of the upstream burst signal transmitted to the OLT by the optical relay is the same as the clock of the OLT, the delay time for clock recovery of the BCDR unit of the OLT is reduced, and thus, the recovery time $t_{RS2}$ of the OLT according to 10 B may be earlier.

In particular, although not illustrated, the optical relay according to the embodiment of the present invention proactively generates a preamble of upstream burst frame data, and some of the upstream burst frame data may also include more preambles than the loss by considering that the electrical signal generation preparation time $T_{RXON}$, the optical signal generation preparation time $T_{TXON}$ and the burst mode clock data recovery time $T_{BCDR}$ of two optical transceivers of the optical relay are lost. As a result, the substantially transmitted time may be slightly delayed, but the loss of the preambles may be compensated by additionally using the optical relay, and thus, the upstream burst frame data received from the OLT side may be maintained substantially similar to the case without using the optical relay. Of course, if there is a sufficient remaining period of the preamble actually transmitted to the OLT, the preamble generated by the optical relay may be reduced, thereby reducing the OLT transmission delay of the upstream burst signal.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the embodiments disclosed in the present disclosure are used to not limit but describe the technical spirit of the present disclosure and the scope of the technical spirit of the present disclosure is not limited by the embodiments. The scope of the present invention should be interpreted by the appended claims and it should be analyzed that all technical spirit in the equivalent range thereto is intended to be embraced by the scope of the present invention.

What is claimed is:

1. A relay apparatus for a passive optical network which relays optical signals of an optical line terminal (OLT) and an optical network terminal (ONT) using a pair of optical transceivers, the relay apparatus comprising:
    a signal detector that detects presence or absence of an upstream burst signal earlier than an electrical signal generation preparation time of the optical transceiver connected with the ONT;
    a burst mode clock data recovery (BCDR) unit that recovers a clock and data from an upstream burst signal received to the optical transceiver and converted into an electrical signal by an optical-electrical conversion function;
    a clock data recovery (CDR) unit that recovers an OLT clock and data from a downstream continuous signal received by the optical transceiver connected to the OLT and converted into an electrical signal through an optical-electrical conversion function;
    an asynchronous buffer unit that stores an upstream burst signal using the clock recovered by the BCDR unit as an input clock and outputs the stored signal using the clock recovered by the CDR unit as an output clock; and
    a control unit that proactively generates an upstream burst frame preamble in accordance with the OLT clock recovered by the CDR unit when the upstream burst signal is detected by the signal detector, selects upstream burst frame data subsequent to the upstream burst frame preamble proactively generated when the recovered upstream burst frame data is stored in the asynchronous buffer unit from the asynchronous buffer unit to provide the selected upstream burst frame data to the optical transceiver connected with the OLT according to the OLT clock.

2. The relay apparatus of claim 1, wherein the control unit configures upstream burst frame data to be transmitted by considering a preamble of the recovered upstream burst frame data stored in the asynchronous buffer unit and the proactively generated preamble.

3. The relay apparatus of claim 1, wherein the control unit determines an end point of the upstream burst frame data through continuity of '0' or '1' and predicts a start point of a subsequent upstream burst signal by considering a standard guard time for protecting the upstream burst signal to proactively provide an upstream burst frame data preamble.

4. A relay method for a passive optical network using an apparatus of relaying optical signals of an OLT and an ONT using a pair of optical transceivers, the relay method comprising:

recovering, by a CDR unit configured in the relay apparatus, OLT clock data from a downstream continuous signal received by the optical transceiver connected to the OLT;

providing, by a control unit configured in the relay apparatus, a proactive upstream burst frame preamble generated according to the OLT clock recovered by the CDR unit to the OLT-side optical transceiver when the upstream burst signal received by the optical transceiver connected with the ONT is detected or predicted by a signal pattern;

recovering, by a BCDR unit configured in the relay apparatus, clock data from the upstream burst signal received by the optical transceiver and storing, by an asynchronous buffer unit, the recovered upstream burst frame data using the clock recovered by the BCDR unit as an input clock and the clock recovered by the CDR unit as an output clock; and selecting, by the control unit, all or some of the recovered upstream burst frame data stored in the asynchronous buffer unit to provide the selected upstream burst frame data to the optical transceiver connected with the OLT according to the OLT clock subsequent to the proactively generated upstream burst frame preamble, wherein in the detecting of the upstream burst signal received by the optical transceiver connected with the ONT, the control unit configured in the relay apparatus detects the upstream burst signal received by a signal detector of the relay apparatus that detects the presence of the upstream burst signal earlier than the electrical signal generation preparation time of the optical transceiver.

5. The relay method of claim 4, wherein in the providing of the recovered upstream burst frame data to the optical transceiver connected with the OLT, the control unit configures upstream burst frame data to be transmitted by considering a preamble of the recovered upstream burst frame data stored in the asynchronous buffer unit and the proactively generated preamble.

6. The relay method of claim 4, wherein in the detecting of the upstream burst signal received by the optical transceiver connected with the ONT, the control unit configured in the relay apparatus determines an end point of the upstream burst frame data through continuity of '0' or '1' and predicts a start point of a subsequent upstream burst signal by considering a standard guard time for protecting the upstream burst signal.

* * * * *